United States Patent [19]

Hammer et al.

[11] 3,976,720

[45] Aug. 24, 1976

[54] POLYAMIDE/POLYOLEFIN PLASTIC GRAFT COPOLYMERS

[75] Inventors: Clarence Frederick Hammer; Howard Warner Starkweather, Jr., both of Wilmington, Del.

[73] Assignee: E. I. Du Pont de Nemours and Company, Wilmington, Del.

[22] Filed: Nov. 13, 1974

[21] Appl. No.: 523,466

[52] U.S. Cl. .................... 260/857 G; 260/857 L
[51] Int. Cl.$^2$ ............. C08F 255/02; C08F 267/04; C08F 267/06
[58] Field of Search .................... 260/857 G, 857 L

[56] References Cited
UNITED STATES PATENTS

| | | | |
|---|---|---|---|
| 2,524,045 | 10/1950 | Flory | 260/857 G |
| 3,136,738 | 6/1964 | Hedrick | 260/857 G |
| 3,325,561 | 6/1967 | Grillo | 260/857 G |
| 3,388,186 | 6/1968 | Kray | 260/857 G |
| 3,465,059 | 9/1969 | Seven | 260/857 L |
| 3,553,285 | 1/1971 | Vernaleken | 260/857 G |
| 3,634,543 | 1/1972 | Sherman | 260/857 G |
| 3,644,571 | 2/1972 | Anderson | 260/857 G |

*Primary Examiner*—Allan Lieberman

[57] ABSTRACT

Plastic graft copolymers consisting essentially of a crystalline trunk copolymer derived from ethylene and a comonomer providing amine-reactive sites selected from the group consisting of an anhydride group, a vicinal pair of carboxylic groups and a carboxylic group adjacent to an alkoxycarbonyl group, the alkoxy group having up to 20 carbon atoms, preferably 1 to 4 carbon atoms, and side chain polymers linked to said reactive sites through amide or imide linkages, the side chains having an average degree of polymerization of 5 to 30, preferably 6 to 10, and being derived from monomers selected from the group consisting of caprolactam or laurolactam, said graft copolymer having a polyamide content of 15 to 50 percent by weight based on the weight of graft copolymer with the proviso that the graft copolymer has two DTA melting points, one at 80° to 115°C. and the other at at least 165°C., preferably at 175 to 200°C. when polycaprolactam side chains are present and at least 150°C., preferably 150° to 170°C., when polylaurolactam side chains are present. Preferably, the comonomer is maleic anhydride, half ester of maleic acid or the half ester of itaconic acid. The trunk copolymer preferably contains 85 to 99 percent by weight ethylene.

16 Claims, No Drawings

POLYAMIDE/POLYOLEFIN PLASTIC GRAFT COPOLYMERS

BACKGROUND OF THE INVENTION

1. Field of the Invention

This invention relates to graft copolymers and particularly plastic graft copolymers having polyamide side chains on active sites of an ethylene-containing trunk copolymer.

2. Description of the Prior Art

Graft copolymers are materials having trunk copolymers and attached thereto side chains of another polymeric material. Such copolymers are old in the art, for example, the graft copolymers disclosed in the following U.S. Pat. Nos.: 3,136,738; 3,539,664; 3,644,571 and 3,673,277. The graft copolymers of the prior art, however, were difficult to prepare in pure form and contained substituents that could form crosslinks or unreacted trunk polymers and side-chain polymers. The graft copolymers are useful, for example, as films, molded or extruded objects as well as coatings. While some of the graft copolymers disclosed in the aforementioned patents have an ethylene/maleic anhydride backbone polymer, the graft copolymers can be distinguished. U.S. Pat. No. 3,136,738, in Example 16, describes the preparation of a graft copolymer of a 50:50 ethylene/maleic anhydride and caprolactam, wherein more than a 100-fold excess of caprolactam is present. That example illustrates a noncrystallizable trunk copolymer and a polyamide content of more than 99 percent. U.S. Pat. No. 3,539,664, in Example 7, describes the polymerization of caprolactam, a 31:69 ethylene/maleic anhydride copolymer and omega-amino-caproic acid. A homogeneous composition was achieved. The composition of the patent contains a higher ratio of maleic anhydride in the polymer backbone and contains longer side chains as evidenced by a melting point of 215°C.; the composition having high stiffness and moisture resistance. U.S. Pat. No. 3,644,571 describes a composition having a low level of an olefin:maleic anhydride polymer backbone with polyamide side chains wherein the percentage of polyamide in the graft copolymer is at least 96 percent by weight. U.S. Pat. No. 3,673,277 discloses plastics prepared from copolymers of ethylene and maleic anhydride and particular noncrystalline polyamide which are crosslinkable to form thermosetting plastics.

SUMMARY OF THE INVENTION

According to this invention, there is provided a plastic graft copolymer consisting essentially of a crystalline trunk copolymer derived from ethylene and a comonomer providing amino-reactive sites taken from the group consisting of an anhydride group, a vicinal pair of carboxylic groups and a carboxylic group adjacent to an alkoxycarbonyl group, wherein the alkoxy group has up to 20 carbon atoms, and side chain polymers linked to said reactive site through amide or imide linkages, said side chains having an average degree of polymerization of 5 to 30 and being derived from monomers taken from the group consisting of caprolactam or laurolactam, said graft copolymer having a polyamide content of 15 to 50 percent by weight based on the weight of graft copolymer with the proviso that the graft copolymer has two DTA melting points, one at 80° to 115°C. and the other at at least 165°C. when polycaprolactam side chains are present, and at least 150°C. when polylaurolactam side chains are present. The comonomer providing amino-reactive sites is preferably selected from the group consisting of maleic anhydride, half ester of maleic acid and the half ester of itaconic acid. The side chains have an average degree of polymerization in the range of 5 to 30. The trunk copolymer contains 70 to 99 percent by weight of ethylene, preferably 85 to 99 percent by weight.

The term "consisting essentially of" as employed herein, is meant to include in the graft copolymer only those unspecified polymer units which do not materially affect the basic and essential characteristics of the copolymer such as the differential thermal analysis (DTA), or the degree of polymerization (DP).

DETAILED DESCRIPTION OF THE INVENTION

The plastic graft copolymer of this invention consists essentially of a crystalline trunk copolymer derived from ethylene and a comonomer having amine-reactive sites and side chains linked to the reactive sites through amide or imide linkages, the side chains being either polycaprolactam or polylaurolactam.

The comonomers which together with ethylene form the crystalline trunk copolymer and provide amino-reactive sites are taken from the group consisting of an anhydride group, a vicinal pair of carboxylic groups and a carboxylic group adjacent to an alkoxycarbonyl group, wherein the alkoxy group has up to 20 carbon atoms, preferably 1 to 4 carbon atoms. The amine-reactive sites are preferably provided by maleic anhydride, a half ester of maleic acid or a half ester of itaconic acid. Suitable comonomers used to prepare the trunk copolymers include those of the formulae

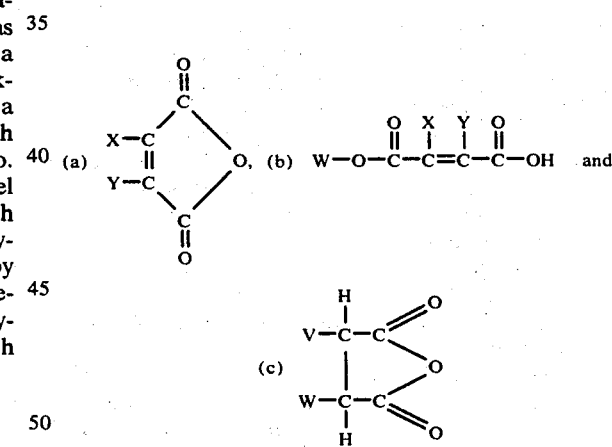

where X and Y are independently selected from H, Cl, $C_1$–$C_8$ alkyl and phenyl, with the proviso that one of X and Y must be H, and W is H, $C_1$–$C_{10}$ alkyl, phenyl, naphthyl or substituted phenyl or naphthyl where the substituents are $C_1$–$C_{10}$ alkyl, halogen, and $C_1$–$C_{10}$ alkoxy groups, and V is a radical containing a $C_2$–$C_{12}$ alkenyl having a copolymerizable double bond.

Compounds representative of formula (a) include maleic anhydride and citraconic anhydride. Compounds representative of formula (b) include maleic acid, citraconic acid, fumaric acid, mesaconic acid and monoesters of maleic and fumaric acid, including the methyl, ethyl, isopropyl, propyl, butyl, tert-butyl, amyl, isoamyl, hexyl, octyl, decyl, phenyl, 1-naphthyl, 2-naphthyl, 2-methylphenyl, 2-ethylphenyl, 2,5-dimethylphenyl, 4-isopropylphenyl, 4-butylphenyl, 3,5- dimethyl-3-propylphenyl, 3-decylphenyl, 4-tetradecylphenyl, 4-hexadecylphenyl, 4-octadecylphenyl, 2-chlorophenyl, 4-methoxyphenyl, 2-chloro-1-naphthyl, 4-chloro-1-naphthyl, 6-chloro-1-naphthyl, 7,8-dichloro-1-naphthyl, 4-bromo-1-naphthyl, 7-chloro-2-naphthyl, 4-methyl-1-naphthyl, and 1-propyl-2-naphthyl. Compounds representative of the formula (c) include alkenyl succinic anhydrides, e.g., 3-ethenyl succinic anhydride, 3-ethenyl, 4-methyl succinic anhydride, 3-allyl succinic anhydride, 3-isopropenyl succinic anhydride, 3-(2-butenyl)succinic anhydride, 3-(4-pentenyl) succinic anhydride, etc. Also useful are itaconic acid, its anhydride and monoesters. The trunk copolymers can be prepared by known vinyl polymerization techniques. The ethylene and comonomers are randomly interconnected through C—C linkages and contain 70–99, preferably 85 to 99, percent by weight of ethylene. The trunk copolymers have a melt index in the range of 5 to 200, preferably 100 to 200. The crystalline melting point of the trunk copolymer is above normal ambient temperature, e.g., about 100°C.

The side chain polymers which are linked to the reactive sites on the trunk copolymer through amide or imide linkages are derived from polymers of caprolactam (6-nylon) or laurolactam (12-nylon). The comparable omega-amino acid can be used also to form the side chain. The side chains are limited in their length, the average degree of polymerization being 5 to 30, preferably 6 to 10, and more preferably 6 to 8. The side chain polymers have one reactive primary amine end group and the other ends or substituent groups are substantially unreactive, e.g., N-alkyl amide wherein alkyl is in the range of 1 to 20, preferably 4 to 6 carbon atoms, carboxylic acid, etc.

The graft copolymers have a polyamide content in the range of 15 to 50 percent by weight. When the side chains are derived from polycaprolactam, the amount of such side chain is 15 to 50 percent by weight, preferably 33 to 50 percent by weight based on the weight of graft copolymer. When, however, the side chains are derived from polylaurolactam, the amount of the side chains is preferably 15 to 30 percent by weight based on the weight of graft copolymer.

Elastomeric graft copolymers have been prepared consisting essentially of an elastomeric trunk copolymer having grafted thereon amino-terminated polycaprolactam or polylaurolactam side-chains. The elastomers are also thermoplastic. Plastic graft copolymers of this invention can be differentiated from elastomeric graft copolymers by several properties, e.g., differential thermal analysis (DTA), flexural modulus, cold draw, etc. The plastic graft copolymers are prepared from a crystalline trunk copolymer and have two DTA melting points, one at 80° to 115°C. and the other at at least 165°C. when solely polycaprolactam side chains are present and at least 150°C. when solely polylaurolactam side chains are present. Elastomeric graft copolymers generally exhibit only one DTA melting point, i.e., the higher temperature stated above. Flexural modulus is another property whereby the plastic graft copolymers disclosed herein can be differentiated from elastomeric graft copolymers. Factors that affect the flexural modulus include not only the difference in components and the amount of each component present but the length of the side chain polymers. Below a flexural modulus of about 28,000 p.s.i. at room temperature the graft copolymers are elastomeric whereas above this value the graft copolymers are plastic. The flexural modulus dividing point between plastic and elastomeric is not sharply drawn however, particularly, when the polyamide content approaches 50 percent by weight. At lower concentrations of polyamide, e.g., 25 percent and less, the flexural modulus of elastomeric graft copolymers is well below 28,000 p.s.i. The trunk copolymers of plastic graft copolymers of this invention when cold drawn at temperatures below their crystalline melting points and held for one minute before release become oriented and do not appreciably recover from the deformation within a one minute period. The elastomeric trunk copolymers on the other hand retract within one minute to less than 1.5 times their original lengths after being stretched at 18°–29°C. to twice their lengths and held for one minute before release.

The graft copolymers can be prepared in various ways. The convenient ways described herein can be identified as (1) the acid chloride route, for use with backbone copolymers having free carboxylic acid groups, (2) the anhydride route, for use with ethylene/maleic anhydride and other anhydride-containing trunk copolymers, and (3) the vicinal acid-ester route, for use with trunk copolymers having monoester of vicinal dicarboxylic acid substituents.

The acid chloride route involves initial conversion of the carboxylic groups of the trunk copolymer to acid chloride groups by reaction with thionyl chloride, the reaction being conducted in solution with a solvent such as toluene or tetrachloroethylene. The solution of polymeric polyacid chloride is agitated at 75°–105°C. for 30 to 60 minutes with a solution of the amine-ended caprolactam dissolved in an inert solvent such as hexamethylphosphoramide to create, in a conventional manner, amide

linkages between the trunk copolymer and the side chain polyamides. An acid acceptor such as triethylamine or pyridine is usually used in the amide-forming stage. The ratio of acid chloride groups to amino end groups can be varied, with the amino groups being in no more than stoichiometric amounts in relation to the acid chloride groups. When less than the stoichiometric amount of polycaprolactam is used, it is desirable to add a low molecular weight amine (e.g., n-hexylamine) or alcohol (e.g., methanol) to react with the excess acid chloride groups in order to avoid having residual reactive or corrosive acid chloride groups in the graft copolymer. With relatively large deficiencies in the polycaprolactam reactant, it is desirable to add any additional monomeric amine along with the oligomer during the grafting reaction. With small deficiencies of polycaprolactam any additional amine may be employed after the grafting reaction with the polycaprolactam has been substantially completed.

The anhydride route, which is preferred, involves simply heating together the trunk copolymer having carboxylic anhydride groups, preferably maleic anhydride, and the polycaprolactam in the molten state, at a temperature in the range 175° to 250°C., preferably at about 225°C., or in solution at a temperature of about 100° to 105°C. In the melt the heating temperature is above the melting point of the trunk copolymer and the The unreacted trunk copolymer can be removed by extraction with boiling toluene, but the graft copolymer cannot. The most sensitive indicator of grafting is the retention of strength and modulus at elevated temperatures, e.g., at 100° to 150°C.

Knowing the degree of polymerization (DP) of each starting 6-nylon or 12-nylon, it is possible to plot DP vs. the peak melting point of each resulting graft copolymer, as determined by DTA. It has been observed that the peak melting point increases for each type of nylon as the DP of the polyamide side chains increases. Such plots can then be used for the identification of the graft copolymers of the present invention.

The above-described process provides control of the type and length of the polymer side chain grafted onto the trunk copolymer. From the specific type of trunk copolymer the average number of possible reactive graft sites can be readily determined by the number, e.g., on a molar basis, of monomer molecules providing the reactive sites which are polymerized into the trunk copolymer. Since the polymeric side chains are preformed prior to reacting with reactive sites on the trunk copolymer excellent control of the graft copolymer is achieved. Thus, there can be prepared a polymer side chain having either a narrow or broad molecular weight distribution. The polymer side chains of various distributions can be made at various times and then grafted at different times. The plastic graft copolymer prepared is relatively uncontaminated with ungrafted side chain polymer which is a major problem in conventional graft copolymerization involving reaction with monomers.

The graft copolymers have many useful physical properties which make them useful in, for example, flexible films and flexible tubing. The copolymers retain modulus at elevated temperatures which extends the usefulness of the films and tubes into temperatures which cause failure of articles made with merely blended mixtures of polyethylene and polyamide. The graft copolymers, for example, of Examples 5, 9, 13–15 were injection molded to give pieces having the stated mechanical properties. They also provide useful toughness at low temperatures. Graft copolymers having polylaurolactam side chains have been found especially resistant to zinc chloride (Examples 8, 9 and 15). Reduced water absorption is a useful property achieved when compared with materials such as homopolycaprolactam (Nylon-6) or blends thereof with polyethylene. When the degree of polymerization of the polycaprolactam branches is DP 6–8, the water absorption is especially low in proportion to the polyamide content.

The graft copolymers can be blended with relatively low molecular weight thermoplastic resins to produce a hot melt adhesive. It has been found that the adhesive has greater resistance to failure at elevated temperatures than does an adhesive based on ungrafted ethylene copolymers. The copolymers are also useful as blending aids.

EXAMPLES OF THE INVENTION

The following examples wherein the percentages and parts are by weight illustrate the invention.

The copolymerization reaction to form the trunk copolymer can be carried out most advantageously in a pressure reactor at a temperature of 90°–250°C. and a pressure of 1600–2200 atm. The polymerization temperature is preferably maintained at about 145°C. and the pressure at 1800–2000 atm. Usually, the polymerization process is continuous, the monomer, optionally a solvent such as benzene, and the initiator being introduced at a controlled rate, and the reaction product being continuously removed. A stirred autoclave such as described in U.S. Pat. No. 2,897,183 to Christl et al. can be used. Suitable free-radical polymerization initiators include organic peroxides, for example, lauryl peroxide, and di-t-butyl peroxide; peresters, such as t-butyl peracetate and t-butyl peroxypivalate; and azo compounds, such as azobisisobutyronitrile.

The degree of polymerization (DP) of the amine-terminated oligomer side chain is determined by end group analysis. The amine end groups are determined by titration with a strong acid, either in the presence of an indicator or by a potentiometric or a conductometric method. Acid end groups are determined by titration with a strong base. These techniques are discussed in *Nylon Plastics*, M. I. Kohan, Editor, pp. 38 and 105, John Wiley and Sons, New York (1973), and in *Encyclopedia of Polymer Science and Technology*, Vol. 10, pp. 542 and 543, John Wiley and Sons, New York (1969). The following tests were used in the Examples to provide physical property measurements of the graft copolymers. Differential thermal analysis (DTA) is the method used to determine the melting points of the graft copolymer expressed in °C. The melting point is read from the position of the endotherm peak in a thermogram when the sample is heated from room temperature at the rate of 20°C./min. The details of this method are described, for example, by C. B. Murphy in Differential Thermal Analysis, R. C. MacKenzie, Editor, Volume I, pp. 643 to 671, Academic Press, New York, 1970. Melt index is determined by the standard test ASTM D-1238-73, Condition E or Condition A and then converted to an equivalent value for Condition E. Percent elongation at break, tensile strength at yield in p.s.i. (Yield Point), percent ultimate elongation and ultimate tensile strength in p.s.i. are measured by the standard ASTM D-638-72 test. Flexural modulus is measured by standard ASTM D-790-71. Samples are compression molded at 190° to 220°C. in a laboratory press or injection molded in the form of 5 inch × 0.5 inch × 0.125 inch bars. The bars are conditioned at room temperature 16–24 hours before testing. The test is conducted using a 2 inch span at a crosshead speed of 0.05 inch/min. The tangent modulus of elasticity (flexural modulus) is calculated using the equation given in the ASTM procedure. The value obtained is expressed in flex modulus in lb./sq. in. Izod impact strength Test (Izod) was determined by standard ASTM D-256-73. Samples are injection molded at 285°C. in the form of bars 5 inches × 0.5 inch × 0.125 inch into which notches are machined and cut to length as specified in ASTM D-256-73. Samples are allowed to condition at room temperature for 16–24 hours, after cutting and notching, before testing. Five bars of each sample are tested and the average value reported as the Izod Impact Strength in ft. lbs./inch of notch.

EXAMPLE 1

Caprolactam (50 g.) was reacted with n-hexyl amine (10 g.) in a shaker tube at 250°C. to form an oligomer having an average degree of polymerization (DP) of 7. This oligomer was mixed with a copolymer of ethylene containing 4.2 percent maleic anhydride and having a melt index of about 5 on a roll mill at 225°C. under a blanket of nitrogen. The mixture contained 16 percent polyamide. After mixing for two minutes the melt bepolycaprolactam. The time of reaction, which is dependent upon the temperature, can vary from less than about 0.5 to 60 minutes in the melt, preferably 1 to 10 minutes, and from ½ to 5 hours in solution, preferably 60 to 90 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. The reaction time is limited largely by the speed of mixing. Completeness of reaction can be judged by the appearance of the product, good clarity in the melt indicating essentially complete reaction. With a roll mill as the reactor, the trunk copolymer and polycaprolactam can be premixed or mixed during reaction on the mill, and because of the exposure it may be desirable to include stabilizing agents such as inhibitors or antioxidants, or to carry out the operation in a protective atmosphere such as nitrogen. With an extruder as the reactor, premixing is desirable. On the basis of IR analysis of the products, an interpretation of the course of the thermal reaction is that it may proceed through initial formation of amic acids to ultimate formation of amide or imide linkages between the trunk copolymer and the polyamide side chains, e.g.,:

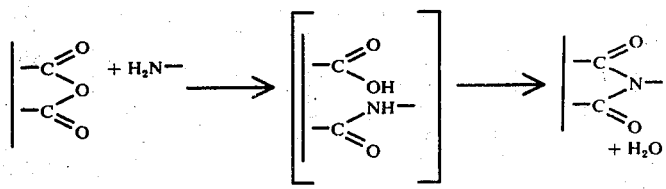

The amount of amino polycaprolactam used can vary from a stoichiometrical deficiency to an equivalent amount, depending upon the extent of said chain substitution desired on the graft copolymer.

The vicinal acid-ester route has in general the operating characteristics of the anhydride route, i.e., it can be carried out in solution or in the melt for reaction times similar to those for the anhydride route described above. Graft copolymer is believed to be obtained by attachment of the polycaprolactam side chain to the trunk copolymer through imide linkages (with elimination of alcohol and water) which may be derived through intermediate formation of amic acids, e.g.,

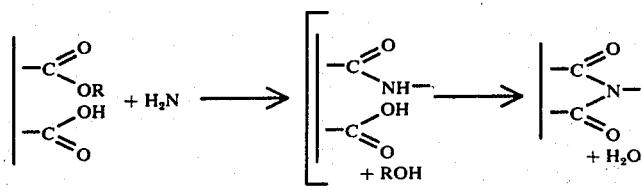

or by prior conversion of the vicinal acid-ester by loss of alcohol to an anhydride and reaction of the latter with the polycaprolactam as described above. The description above of the anhydride route as carried out on a roll mill or in an extruder applies as well to the vicinal acid-ester route conducted in the same way.

The reaction of the amine group with the anhydride is fast, so that the effective reaction rate of polymers containing these groups is largely limited by other factors such as the rate of mixing. When two polymers are dissolved separately and the two solutions poured together, rapid intimate mixing is obtained.

The graft copolymers are identified as such, rather than as mere mixtures or blends of polyamides with predominantly hydrocarbon ethylenic polymers, by their clarity in the melt, by their solubility properties, and by their retention of physical properties, e.g., tensile strength, modulus, etc., at elevated temperatures. Blended mixtures of the carboxylic backbone copolymers and the lactam oligomers are characteristically cloudy in the melt prior to completion of the grafting reaction. The mixtures, in contrast to the graft copolymers, can be separated by extraction with suitable solvents.

The progress of grafting can be followed by infrared spectroscopy. When the starting trunk polymer contains 5-membered, cyclic anhydride active sites, the disappearance of either one of two characteristic absorption bands at 5.4 microns or at 5.6 microns indicates that grafting is taking place. The proportion of the anhydride groups in the starting trunk polymer can be determined by forming a polymer film of known thickness and examining the infrared spectrum of such film. It has been found experimentally that 0.28 absorption units/0.025 mm at 5.4 microns or 2.2 absorption units/0.025 mm. at 5.6 microns correspond to 10 weight percent anhydride. The absorption units are read directly from an infrared spectrogram.

Similarly, when the starting trunk copolymer contains vicinal carboxyl and alkoxycarbonyl groups, the characteristic infrared absorption band lies at 5.9 microns. Assuming the vicinal carboxyl and alkoxycarbonyl groups to be derived from ethyl hydrogen maleate, the characteristic absorption will be 1.1 absorption units/0.025 mm for every 10 weight percent maleate present. Such analytical techniques would not be practical in the case of a starting copolymer containing vicinal carboxyl groups. However, the concentration of carboxyl groups can be readily determined by simple titration.

The graft copolymer product can be characterized by several techniques, which show the presence of polyamide side chains, the degree of polymerization of the polyamide side chains, and the molecular weight of the graft copolymer to name a few. Certain physical characteristics, often are also helpful to show that a graft copolymer has been obtained.

The presence of polyamide is shown by infrared absorption at 6.0 microns (amide carbonyl). Other useful wave lengths include 6.4 microns (-NH bending) and 3.0 microns (—NH stretching). The proportion of polyamide is determined by Kjeldahl analysis for percent N.

came transparent, and the product was molded to give transparent films or bars which exhibited DTA melting points at 107° and 178°C.

EXAMPLE 2

Example 1 was repeated except that 40 percent of an oligomer of caprolactam having an average degree of polymerization of 15 was used. About 4 minutes on the roll mill was required to produce a transparent melt. The product exhibited DTA melting points at 107° and 207°C.

Five (5) parts of the graft copolymer of this Example were blended with 80 parts of polycaprolactam (Plaskin 8200) and 20 parts of high density polyethylene (Alathon 7050) in a twin screw extruder. The blend was injection molded to give specimens which had the following properties: flexural modulus 287,000 p.s.i., yield point, 8,130 p.s.i., ultimate strength 9080 p.s.i., ultimate elongation 250 percent, notched Izod impact strength, 1.4 ft.lb./in. A surface obtained by fracturing a specimen in liquid nitrogen was examined with a scanning electron microscope. This showed that the polyethylene was dispersed in regions 0.3–0.5 micron in diameter. The adhesion between the nylon and the polyethylene was good.

EXAMPLE 3

Example 1 was repeated except that 25 percent of oligomer of caprolactam having an average degree of polymerization of 5.8 was used. The graft copolymer had DTA melting points at 106° and 177°C.

EXAMPLE 4

Thirty-five percent of an oligomer prepared from caprolactam and n-hexyl amine having an average degree of polymerization of 7 was reacted with a copolymer of ethylene containing 6.2 percent maleic anhydride having a melt index of 5.1 in a single pass through a twin screw extruder at 225°C. The graft copolymer was transparent and had a flexural modulus of 28,900 p.s.i. DTA melting points occurred at 97° and 182°C.

A blend was made from 75 parts 66-nylon (Zytel 101), 25 parts Alathon 7050, and 2 parts of the graft copolymer of this Example. The molded blend had the following properties: flexural modulus 359,000 p.s.i., yield point 7,480 p.s.i., ultimate tensile strength 6300 p.s.i., ultimate elongation 200 percent, notched Izod Impact strength 1.2 ft.lb./in. The diameter of the polyethylene regions was 0.2–0.5 micron, and the adhesion between the nylon and the polyethylene was good.

EXAMPLE 5

Example 4 was repeated except that the polyamide content was 46 percent and the ethylene copolymer contained 9.8 percent maleic anhydride and had a melt index of 126. The graft copolymer had a flexural modulus of 40,000 p.s.i., a yield point of 2420 p.s.i., an ultimate tensile strength of 2440 p.s.i., and an elongation at break of 120 percent. DTA melting points occurred at 104° and 178°C.

EXAMPLE 6

A copolymer of ethylene containing 5.7 percent maleic anhydride having a melt index of 4.4 was reacted with 33 percent of an oligomer made from caprolactam and n-hexyl amine having an average degree of polymerization of 6.7 in a twin screw extruder at 225°C. to form a graft copolymer. A compression molded film 0.35 mm. (13.6 mils) thick had a modulus of 29,000 p.s.i., a tensile strength of 3,600 p.s.i., and an elongation of 50.5 percent. The film was stretched biaxially at 104°C. 2X in each direction to form a film 0.09 mm. (3.6 mils) thick which had a modulus of 101,000 p.s.i., a tensile strength of 11,500 p.s.i., and an elongation of 59 percent. When the biaxially stretched film was heated at 101°-120°C., it shrank so that its area was reduced by 31–38 percent. DTA melting points occurred at about 100° and 184°C.

EXAMPLE 7

A copolymer of ethylene containing 9.0 percent ethyl hydrogen maleate by weight was reacted with 22 percent of an oligomer made from caprolactam and n-hexyl amine having an average degree of polymerization of 6.7 on a roll mill at 225°C. A transparent graft copolymer was formed. DTA melting points occurred at 113° and 180°C.

EXAMPLE 8

A copolymer of ethylene containing 5.2 percent by weight maleic anhydride having a melt index of 105 was reacted with 40 percent of an oligomer made from laurolactam and n-hexyl amine having an average degree of polymerization of 5.9 on a roll mill at 175°C. to form a graft copolymer which had a flexural modulus of 112,000 p.s.i. at 23°C., 74,500 p.s.i. at 60°C., and 39,000 p.s.i. at 100°C. When scored with a razor blade, folded sharply and immersed in an aqueous solution of 50 weight percent zinc chloride at room temperature, four bars ⅛ inch thick lasted 34 days before cracking (ASTM D-1693-70 modified). Three of the bars lasted 42 days and one bar over 68 days before cracking. DTA melting points occurred at 98° and 160°C. The graft copolymer is useful in flexible tubing.

EXAMPLE 9

A copolymer of ethylene containing 4.5 percent maleic anhydride having a melt index of 180 was reacted in an extruder with 25 percent of an oligomer having an average degree of polymerization of 6.35 made from laurolactam and n-hexyl amine. The graft copolymer had a flexural modulus of 52,900 p.s.i., a tensile strength of 2300 p.s.i., and an elongation at break of 90 percent. The brittleness temperature, determined by ASTM Method D 746-73, was below −76°C. DTA melting points occured at 105° and 155°C. The graft copolymer is useful in flexible tubing.

EXAMPLE 10

A copolymer of ethylene containing 10.4 percent maleic anhydride having a melt index of 92 was reacted with 40 percent of an oligomer of caprolactam having an average degree of polymerization of 7 which had been made without any amine and contained both carboxyl and amino end groups. The reaction was carried out on a roll mill at 225°C. and the melt became clear and transparent in 60 seconds. The graft copolymer had DTA melting points at 95° and 195°C.

EXAMPLE 11

Example 10 was repeated except that the oligomer was made from caprolactam and n-butyl amine and had an average degree of polymerization of 6.5. The time to become clear on a roll mill at 225°C. was 35 seconds. The graft copolymer had DTA melting points at 80° and 190°C.

EXAMPLE 12

Example 10 was repeated except that the oligomer was made from caprolactam and n-octadecyl amine and had an average degree of polymerization of 6. The melt became clear after 35 seconds on a roll mill at 225°C. and the graft copolymer had DTA melting points at 99° and 193°C.

EXAMPLE 13

A copolymer of ethylene containing 19 percent ethyl hydrogen maleate having a melt index of 180 was reacted in an extruder with 35 percent of an oligomer having an average degree of polymerization of 7.7 made from caprolactam and n-hexyl amine. The graft copolymer had DTA melting points at 87° and 192°C., a flexural modulus of 55,500 p.s.i., a tensile strength of 3190 p.s.i., and an elongation at break of 170 percent.

EXAMPLE 14

Example 13 was repeated except that the ethylene copolymer contained 29 percent butyl hydrogen itaconate and had a melt index of 290. The graft copolymer had DTA melting points at 99°, 186° and 210°C., a flexural modulus of 46,500 p.s.i., a tensile strength of 2320 p.s.i., and an elongation at break of 190 percent.

EXAMPLE 15

A copolymer of ethylene containing 17 percent ethyl hydrogen maleate having a melt index of 92 was reacted in an extruder with 25 percent of an oligomer having an average degree of polymerization of 5.34 made from laurolactam and n-hexyl amine. The graft copolymer had DTA melting points at 100° and 150°C., a flexural modulus of 37,200 p.s.i., a tensile strength of 3640 p.s.i., and an elongation at break of 230 percent. The graft copolymer is useful in flexible tubing.

We claim:

1. Plastic graft copolymer consisting essentially of a trunk copolymer derived from 70 to 99 percent by weight ethylene and a comonomer providing amine-reactive sites taken from the group consisting of an anhydride group, a vicinal pair of carboxylic groups and a carboxylic group adjacent to an alkoxycarbonyl group, wherein the alkoxy group has up to 20 carbon atoms, and side chain polymers linked to said reactive sites through amide or imide linkages, said side chains having an average degree of polymerization of 6 to 8 and having substantially unreactive N-alkyl amide end groups wherein alkyl is in the range of 4 to 6 carbon atoms and being derived from monomers taken from the group consisting of caprolactam or laurolactam, said graft copolymer having a polyamide content of 15 to 50 percent by weight based on the weight of graft copolymer with the proviso that the graft copolymer has two DTA melting points, one at 80° to 115°C. and the other at at least 165° C. when polycaprolactam side chains are present and at least 150°C. when polylaurolactam side chains are present.

2. Graft copolymer according to claim 1 wherein said comonomer providing amine-reactive sites is selected from the group consisting of maleic anhydride, half ester of maleic acid and the half ester of itaconic acid.

3. Graft copolymer according to claim 1 wherein the trunk copolymer is derived from ethylene and maleic anhydride.

4. Graft copolymer according to claim 2 wherein the trunk copolymer is derived from ethylene and ethyl hydrogen maleate.

5. Graft copolymer according to claim 2 wherein the trunk copolymer is derived from ethylene and butyl hydrogen itaconate.

6. Graft copolymer according to claim 1 wherein alkoxy of the alkoxycarbonyl group is of 1 to 4 carbon atoms.

7. Graft copolymer according to claim 1 wherein the side chains have an average degree of polymerization of 6 to 10.

8. Graft copolymer according to claim 1 wherein the side chains have an average degree of polymerization of 6 to 8.

9. Graft copolymer according to claim 1 wherein the trunk copolymer has a melt index of 5 to 200.

10. Graft copolymer according to claim 1 wherein the trunk copolymer contains 85 to 99 percent by weight ethylene.

11. Graft copolymer according to claim 1 wherein the side chains are derived from polycaprolactam in an amount of 33 to 50 percent by weight based on the weight of graft copolymer.

12. Graft copolymer according to claim 1 wherein the side chains are derived from polylaurolactam in an amount of 15 to 30 percent by weight based on the weight of graft copolymer.

13. Graft copolymer according to claim 1 wherein the side chains are derived from polycaprolactam and the DTA melting points are at 80° to 115°C. and 175° to 200°C.

14. Graft copolymer according to claim 1 wherein the side chains are derived from polylaurolactam and the DTA melting points are at 80° to 115°C. and 150° to 170°C.

15. Graft copolymer according to claim 1 wherein the flexural modulus at room temperature is at least 28,000 p.s.i.

16. Graft copolymer according to claim 1 wherein alkyl in the N-alkyl amide end group is in the range of 4 to 6 carbon atoms.

* * * * *